United States Patent
Boyer et al.

(10) Patent No.: US 8,270,320 B2
(45) Date of Patent: Sep. 18, 2012

(54) METHOD AND APPARATUS FOR LAUNCHING A CONFERENCE BASED ON PRESENCE OF INVITEES

(75) Inventors: David G. Boyer, Oceanport, NJ (US); Ajita John, Holmdel, NJ (US); Reinhard P. Klemm, Basking Ridge, NJ (US); Doree D. Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1300 days.

(21) Appl. No.: 10/979,759

(22) Filed: Nov. 2, 2004

(65) Prior Publication Data

US 2006/0067250 A1  Mar. 30, 2006

Related U.S. Application Data

(63) Continuation-in-part of application No. 10/955,918, filed on Sep. 30, 2004.

(51) Int. Cl.
*H04Q 11/00* (2006.01)
(52) U.S. Cl. ...................................... 370/260
(58) Field of Classification Search ............ 379/202.01–205.01; 709/204, 229; 370/260, 259; 715/753
See application file for complete search history.

(56) References Cited

U.S. PATENT DOCUMENTS

| | | | |
|---|---|---|---|
| 5,619,555 A | 4/1997 | Fenton et al. | |
| 5,754,830 A | 5/1998 | Butts et al. | |
| 5,862,223 A | 1/1999 | Walker et al. | |
| 5,887,136 A * | 3/1999 | Yasuda et al. | 709/204 |
| 5,899,995 A | 5/1999 | Millier et al. | |
| 5,930,238 A | 7/1999 | Nguyen | |
| 6,029,195 A | 2/2000 | Herz | |
| 6,044,378 A | 3/2000 | Gladney | |
| 6,078,928 A | 6/2000 | Schnase et al. | |
| 6,088,732 A * | 7/2000 | Smith et al. | 709/229 |
| 6,147,993 A | 11/2000 | Kloth et al. | |
| 6,182,133 B1 | 1/2001 | Horvitz | |

(Continued)

FOREIGN PATENT DOCUMENTS

EP   0669733 A2   8/1995

(Continued)

OTHER PUBLICATIONS

Chakraborty et al., "Extending the Reach of Business Processes," Communications, 104-106 (Apr. 2004).

(Continued)

*Primary Examiner* — Yuwen Pan
*Assistant Examiner* — Sonia Gay

(57) ABSTRACT

Methods and apparatus are provided for establishing a conference based on the presence or preferences (or both) of one or more invitees. The presence of each invitee is evaluated on one or more devices. A media type is selected based on the presence information. User preference information may be evaluated for those invitees who are not currently present on a device. The selected media type for the conference may optionally be required to support the requirements of the conference, such as document sharing or video links. In this manner, the same communication application can trigger conferences of different media types (where the selected media type is most likely to lead to the successful establishment of the conference). In addition, the present invention allows a media type to be selected that will be more likely to lead to the successful establishment of a conference.

13 Claims, 8 Drawing Sheets

U.S. PATENT DOCUMENTS

| | | | |
|---|---|---|---|
| 6,195,657 B1 | 2/2001 | Rucker et al. | |
| 6,321,221 B1 | 11/2001 | Bieganski | |
| 6,321,268 B1 | 11/2001 | Dillon et al. | |
| 6,324,541 B1 | 11/2001 | de L'Etraz et al. | |
| 6,449,649 B1 | 9/2002 | Janay et al. | |
| 6,480,830 B1 | 11/2002 | Ford et al. | |
| 6,490,577 B1 | 12/2002 | Anwar | |
| 6,553,028 B1 | 4/2003 | Tang et al. | |
| 6,556,563 B1 | 4/2003 | Yarlagadda | |
| 6,584,472 B2 | 6/2003 | Classen | |
| 6,604,129 B2 | 8/2003 | Slutsman et al. | |
| 6,633,889 B2 | 10/2003 | Dessloch et al. | |
| 6,707,471 B2 | 3/2004 | Funaki | |
| 6,760,727 B1 | 7/2004 | Schroeder et al. | |
| 6,792,265 B1 | 9/2004 | Chan et al. | |
| 6,810,395 B1 | 10/2004 | Bharat | |
| 6,816,850 B2 | 11/2004 | Culliss | |
| 6,826,593 B1 | 11/2004 | Acharya et al. | |
| 6,847,959 B1 | 1/2005 | Arrouye et al. | |
| 6,901,394 B2 | 5/2005 | Chauhan et al. | |
| 6,915,298 B1 | 7/2005 | Cain et al. | |
| 6,934,750 B2 | 8/2005 | Hijikata et al. | |
| 6,993,590 B1 | 1/2006 | Gauthier et al. | |
| 7,046,779 B2 | 5/2006 | Hesse | |
| 7,050,963 B2 | 5/2006 | Flavin | |
| 7,069,308 B2 | 6/2006 | Abrams | |
| 7,076,244 B2 | 7/2006 | Lazaridis et al. | |
| 7,080,082 B2 | 7/2006 | Elder et al. | |
| 7,103,609 B2 | 9/2006 | Elder et al. | |
| 7,124,167 B1 | 10/2006 | Bellotti et al. | |
| 7,127,492 B1 | 10/2006 | Calo et al. | |
| 7,149,288 B2 | 12/2006 | Digate et al. | |
| 7,167,833 B2 | 1/2007 | Mashiko et al. | |
| 7,240,270 B2 | 7/2007 | Bellier et al. | |
| 7,263,177 B1 | 8/2007 | Paterik et al. | |
| 7,284,002 B2 | 10/2007 | Doss et al. | |
| 7,289,975 B2 | 10/2007 | Clarke et al. | |
| 7,305,437 B2 | 12/2007 | Horvitz et al. | |
| 7,325,202 B2 | 1/2008 | Shirriff | |
| 7,389,351 B2 * | 6/2008 | Horvitz | 709/227 |
| 7,418,090 B2 | 8/2008 | Reding et al. | |
| 7,587,664 B2 | 9/2009 | Newbold | |
| 7,644,144 B1 | 1/2010 | Horvitz et al. | |
| 7,865,457 B2 | 1/2011 | Ravin et al. | |
| 2002/0038331 A1 | 3/2002 | Flavin | |
| 2002/0065110 A1 | 5/2002 | Enns et al. | |
| 2002/0075304 A1 | 6/2002 | Thompson et al. | |
| 2002/0087520 A1 | 7/2002 | Meyers | |
| 2002/0143994 A1 | 10/2002 | Sun et al. | |
| 2002/0156787 A1 | 10/2002 | Jameson et al. | |
| 2002/0156841 A1 | 10/2002 | Landfeldt et al. | |
| 2002/0174237 A1 | 11/2002 | Shrinivasan et al. | |
| 2002/0184373 A1 | 12/2002 | Maes | |
| 2002/0188620 A1 | 12/2002 | Doss et al. | |
| 2003/0014399 A1 | 1/2003 | Hansen et al. | |
| 2003/0014488 A1 | 1/2003 | Dalal et al. | |
| 2003/0028525 A1 | 2/2003 | Santos et al. | |
| 2003/0048880 A1 | 3/2003 | Horvath et al. | |
| 2003/0063121 A1 | 4/2003 | Kumhyr et al. | |
| 2003/0065955 A1 | 4/2003 | Kumhyr et al. | |
| 2003/0070176 A1 | 4/2003 | Parker et al. | |
| 2003/0105826 A1 | 6/2003 | Mayraz | |
| 2003/0115089 A1 | 6/2003 | Lurie | |
| 2003/0126205 A1 | 7/2003 | Lurie | |
| 2003/0140037 A1 | 7/2003 | Deh-Lee | |
| 2003/0145056 A1 | 7/2003 | Fujisawa et al. | |
| 2003/0158915 A1 | 8/2003 | Gebhart | |
| 2003/0163520 A1 | 8/2003 | Bussani et al. | |
| 2003/0195787 A1 | 10/2003 | Brunk et al. | |
| 2003/0204431 A1 | 10/2003 | Ingman | |
| 2003/0225825 A1 | 12/2003 | Healey et al. | |
| 2003/0227920 A1 | 12/2003 | Benayoun et al. | |
| 2004/0034723 A1 | 2/2004 | Giroti | |
| 2004/0041902 A1 | 3/2004 | Washington | |
| 2004/0088275 A1 | 5/2004 | Elder et al. | |
| 2004/0088303 A1 | 5/2004 | Elder et al. | |
| 2004/0122803 A1 | 6/2004 | Dom et al. | |
| 2004/0133638 A1 | 7/2004 | Doss et al. | |
| 2004/0161090 A1 * | 8/2004 | Digate et al. | 379/202.01 |
| 2004/0186852 A1 | 9/2004 | Rosen | |
| 2004/0199580 A1 * | 10/2004 | Zhakov et al. | 709/204 |
| 2004/0205766 A1 | 10/2004 | Lee et al. | |
| 2004/0260677 A1 | 12/2004 | Malpani et al. | |
| 2005/0018827 A1 | 1/2005 | Himmel et al. | |
| 2005/0033657 A1 | 2/2005 | Herrington et al. | |
| 2005/0034079 A1 | 2/2005 | Gunasekar et al. | |
| 2005/0065797 A1 | 3/2005 | Haenel | |
| 2005/0071421 A1 | 3/2005 | Calo et al. | |
| 2005/0076013 A1 | 4/2005 | Hilbert et al. | |
| 2005/0125487 A1 | 6/2005 | O'Connor et al. | |
| 2005/0131897 A1 | 6/2005 | Grasso et al. | |
| 2005/0222987 A1 | 10/2005 | Vadon | |
| 2005/0232166 A1 * | 10/2005 | Nierhaus | 370/260 |
| 2005/0270973 A1 | 12/2005 | Raev et al. | |
| 2005/0278326 A1 | 12/2005 | Horvitz et al. | |
| 2005/0289470 A1 | 12/2005 | Pabla et al. | |
| 2006/0029003 A1 * | 2/2006 | Hassan et al. | 370/259 |
| 2006/0044307 A1 | 3/2006 | Song | |
| 2006/0136377 A1 | 6/2006 | Patt-Shamir et al. | |
| 2006/0177034 A1 | 8/2006 | Reding et al. | |
| 2007/0094024 A1 | 4/2007 | Kristensson et al. | |
| 2007/0165591 A1 | 7/2007 | Higure et al. | |
| 2008/0239995 A1 | 10/2008 | Lee et al. | |

FOREIGN PATENT DOCUMENTS

| | | |
|---|---|---|
| EP | 1416696 A | 3/2003 |
| WO | 0135272 A2 | 5/2001 |
| WO | 2004044705 A2 | 5/2004 |
| WO | 2004046875 A2 | 6/2004 |

OTHER PUBLICATIONS

Hashem, Lisa, "U.S. Appl. No. 10/955,918 Office Action Oct. 6, 2008", ,Publisher: USPTO, Published in: US.

Patel, Hemant Shantilal, "U.S. Appl. No. 10/955,918 Office Action Feb. 17, 2010", , Publisher: USPTO, Published in: US.

Hashem, Lisa, "U.S. Appl. No. 10/955,918 Jul. 10, 2009", , Publisher: USPTO, Published in: US.

Smith, Joshua Y., "U.S. Appl. No. 10/989,105 Office Action Dec. 23, 2008", , Publisher: USPTO, Published in: US.

Smith, Joshua Y., "U.S. Appl. No. 10/989,105 Office Action Jan. 9, 2008", , Publisher: USPTO, Published in: US.

Smith, Joshua Y., "U.S. Appl. No. 10/989,105 Office Action Jun. 24, 2009", , Publisher: USPTO, Published in: US.

Smith, Joshua Y., "U.S. Appl. No. 10/989,105 Office Action Jul. 9, 2008", , Publisher: USPTO, Published in: US.

Smith, Joshua Y., "U.S. Appl. No. 10/989,105 Panel Decision May 25, 2010", ,Publisher: USPTO, Published in: US.

Schorgg, A., "EP Application No. 05254998.7-2414 Office Action Nov. 29, 2006", , Publisher: EPO, Published in: EP.

Schorgg, A., "EP Application No. 05254998.7-2414 Office Action May 13, 2008", , Publisher: EPO, Published in: EP.

NG, Christine Y., "U.S. Appl. No. 10/989,104 Office Action Nov. 28, 2008", , Publisher: USPTO, Published in: US.

NG, Christine Y., "U.S. Appl. No. 10/989,104 Office Action May 8, 2008", , Publisher: USPTO, Published in: US.

Kautz et al., "Agent Amplified Communication", "Proceedings of the Thirteenth National Conference on Artifical Intelligence (AAAI-96)", 1996, Published in: US.

De Laat, Maarten, "Network and content analysis in an online community discourse", 2002, Publisher: University of Nijmegen, Published in: NL.

Kautz et al., "ReferralWeb: Combining Social Networks and Collaborative Filtering", "Communications of the ACM", Mar. 1997, vol. 40, No. 3, Published in: US.

Nazzaro, A, "EP Application No. 05254895.5 Office Action Oct. 30, 2006", , Publisher: EPO, Published in: EP.

"EP Application No. 05254895.5 Office Action Mar. 20, 2009", , Publisher: EPO, Published in: EP.

"EP Application No. 05 254 895.5 Office Action May 19, 2008", , Publisher: EPO, Published in: EP.

"EP Application No. 05254895.5 Decision to Refuse Apr. 15, 2009", , Publisher: EPO, Published in: EP.

Nazzaro, A, "EP Appliction No. 05254895.5 Search Report Apr. 3, 2006", , Publisher: EPO, Published in: EP.

Le, Hung D., "U.S. Appl. No. 10/955,917 Advisory Action Nov. 14, 2008", , Publisher: USPTO, Published in: US.

Le, Hung D., "U.S. Appl. No. 10/955,917 Office Action Oct. 23, 2009", , Publisher: USPTO, Published in: US.

Le, Hung D. , "U.S. Appl. No. 10/955,917 Office Action Jan. 15, 2008", , Publisher: USPTO, Published in: US.

Le, Hung D., "U.S. Appl. No. 10/955,917 Office Action Feb. 17, 2009", , Publisher: USPTO, Published in: US.

Le, Hung D., "U.S. Appl. No. 10/955,917 Office Action Mar. 12, 2007", , Publisher: USPTO, Published in: US.

Le, Hung D., "U.S. Appl. No. 10/955,917 Office Action Mar. 25, 2010", , Publisher: USPTO, Published in: US.

Le, Hung D., "U.S. Appl. No. 10/955,917 Office Action Jul. 27, 2010", , Publisher: USPTO, Published in: US.

Le, Hung D. , "U.S. Appl. No. 10/955,917 Office Action Aug. 1, 2008", , Publisher: USPTO, Published in: US.

Le, Hung D. , "U.S. Appl. No. 10/955,917 Office Action Aug. 16, 2007", , Publisher: USPTO, Published in: US.

"EP Application No. 05254895.5 Summons to Oral Proceedings Jan. 26, 2009", , Publisher: EPO, Published in: EP.

Smith, Joshua Y., "U.S. Appl. No. 10/989,105 Office Action Dec. 10, 2009", , Publisher: USPTO, Published in: US.

Crowder et al., "An Agent Based Approach to Finding Expertise", 2002, Publisher: IAM Group, Published in: UK.

Yimam-Seid et al., "Expert Finding Systems for Organizations: Problem and Domain Analysis and the DEMOIR Approach", "Journal of Organizational Computing and Electronic Commerce", 2003, pp. 1-23, vol. 13, No. 1.

Chandrasekaran et al., "An Expertise Recommender using Web Mining", "FLAIRS-01 Proceedings Knowledge Management", 2001, pp. 291-294, Publisher: AAAI (www.aaai.org).

Hertzum et al., "The information-seeking practices of engineers: searching for documents as well as for people", "Information Processing and Management http://www.elsevier.com/locate/infoproman", 2000, pp. 761-778, Publisher: Elsevier Science Ltd.

Craswell et al., "P@NOPTIC Expert: Searching for Experts not just for Documents", "Mathematical and Information Science", 2001, Publisher: CSIRO Australia, Published in: AU.

Smith, Joshua Y., "U.S. Appl. No. 10/989,105 Office Action Feb. 16, 2011"Publisher: USPTO, Published in: US.

Le, Hung D., "U.S. Appl. No. 10/955,917 Office Action Feb. 17, 2011", , Publisher: USPTO, Published in: US.

Patel, Hemant Shantilal, "U.S. Appl. No. 10/955,918 Notice of Allowance Jan. 10, 2011", , Publisher: USPTO, Published in: US.

Schwartz et al., "Discovering Shared Interests Among People Using Graph Analysis of Global Electronic Mail Traffic", Oct. 1992, Publisher: Department of Computer Science, University of Colorado, Published in: US.

Smith, Joshua Y., "U.S. Appl. No. 10/989,105 Office Action Nov. 26, 2010", , Publisher: USPTO, Published in: US.

Le, Hung D., "U.S. Appl. No. 10/955,917 Office Action Nov. 26, 2010", , Publisher: USPTO, Published in: US.

Le, Hung D., "U.S. Appl. No. 10/955,917 Advisory Action May 17, 2011", , Publisher: USPTO, Published in: US.

* cited by examiner

METHOD AND APPARATUS FOR LAUNCHING A CONFERENCE BASED ON PRESENCE OF INVITEES

CROSS-REFERENCE TO RELATED APPLICATIONS

The present application is a continuation-in-part of U.S. patent application Ser. No. 10/955,918, entitled "Method and Apparatus for Providing Communication Tasks in a Workflow," filed Sep. 30, 2004 and incorporated by reference herein.

FIELD OF THE INVENTION

The present invention relates generally to methods and apparatus for communicating with one or more users, and more particularly, to methods and apparatus for establishing a conference based on the presence of one or more invitees.

BACKGROUND OF THE INVENTION

Many enterprise applications must interact with human users through a variety of media. For example, applications, such as e-commerce, customer relationship management, supply chain and crisis management applications, often interact with a user using one or more of voice, electronic mail, conferencing, instant messaging or text messaging communications media.

Traditionally, developers of such enterprise applications had to integrate the applications with a variety of communication servers that implement the desired communication media. Generally, developers were required to have a thorough understanding of the complex details of the required protocols and devote a substantial part of the application development effort to the integration with communication servers. In addition, developers were required to address the convergence of communication capabilities across protocols and media, i.e., the extension of capabilities from one communication protocol and medium to others and the alignment of similar, yet incongruous capabilities across different protocols and media.

The challenges only increase when a conference must be established among a plurality of participants. In particular, the developer of an enterprise application must typically deal with integration issues for a greater number of participants who may be spread across a number of different domains, potentially requiring knowledge of different protocols and media types for each participant. In addition, even after the developer has addressed the protocol and media issues for each potential participant, the proliferation of different media types and devices for each user presents the problem of the best way to bring people together on a conference. Users may be present on one or more devices depending on location, environment, and preference.

For example, there is little point in conferencing an important customer group with their assigned salesperson on the salesperson's office phone if the salesperson is away at a conference. The salesperson may be available for instant messages (IM) and the launch of an IM conference may be more appropriate at that time. However, when the salesperson is at the office, the salesperson may prefer a voice conference on the office phone with a customer group rather than using an IM. Further, the establishment of the conference may still fail due to the inability of a media type to support the requirements of the conference, such as document sharing or a video link, or due to the unavailability of a necessary artifact (such as a required document). For example, it is premature to schedule a conference concerning an insurance claim if the required claim documentation is unavailable. Hence, the static determination of the media type of a conference results in unnecessary failed communications.

A need therefore exists for methods and apparatus for establishing a conference based on the presence or preferences (or both) of one or more invitees. A further need exists for methods and apparatus for establishing a conference based on the requirements of the conference, which may include necessary infrastructure and artifact availability.

SUMMARY OF THE INVENTION

Generally, methods and apparatus are provided for establishing a conference based on the presence or preferences (or both) of one or more invitees. As the conference is being established, the presence of each invitee is evaluated on one or more devices. Thereafter, a media type for the conference is selected based on the presence information. In one variation, user preference information may be evaluated for those invitees who are not currently present on a device. In a further variation, the selected media type for the conference must also support the requirements of the conference, such as document sharing or video links. In this manner, the same communication application can trigger conferences of different media types (where the selected media type is most likely to lead to the successful establishment of the conference). In addition, the present invention allows a media type to be selected that will be more likely to lead to the successful establishment of a conference.

The present invention recognizes that any communication application that is not able to dynamically determine the best media type of a conference will be prone to repeated failed conferences because of the highly mobile and flexible nature of a user's world today. The ability to successfully bring the right people together to resolve critical issues quickly is a key benefit of this invention.

A more complete understanding of the present invention, as well as further features and advantages of the present invention, will be obtained by reference to the following detailed description and drawings.

DETAILED DESCRIPTION

Figure 1:
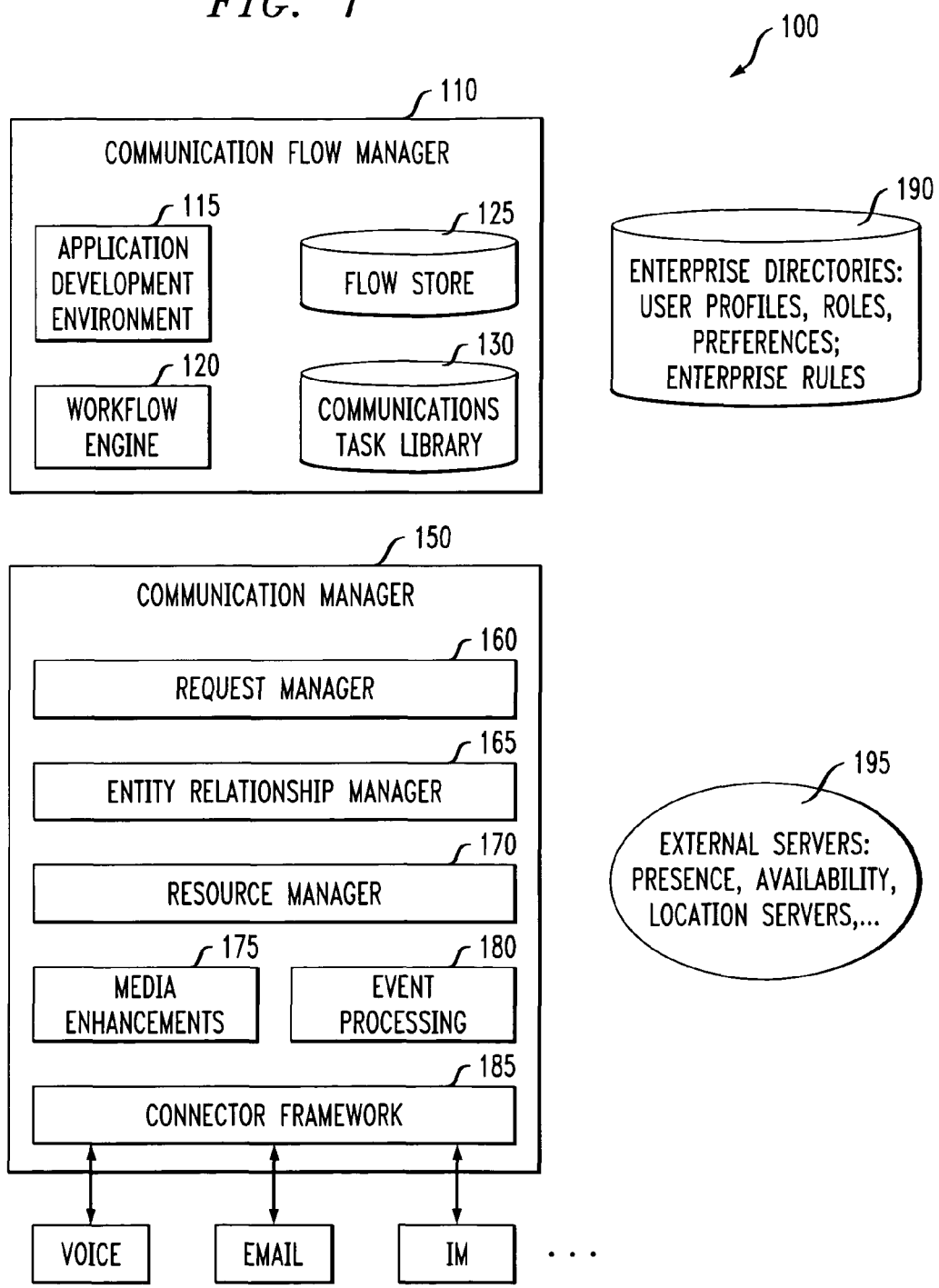
FIG. 1 is a schematic block diagram of a communication application development and execution platform incorporating features of the present invention.

FIG. 1 is a schematic block diagram of a communication application development and execution platform 100 incorporating features of the present invention. The communication application design and execution platform 100 provides a high-level workflow-based programming interface that facilitates the creation and maintenance of complex communications applications. The communication application design and execution platform 100 allows an application developer to integrate an application with existing user communication services, including resource and session management, cross-connection of disparate user communication services, enhancements to the native capabilities of communication services, support for reasoning about past and present communication operations, and aggregated presence. As discussed hereinafter, the runtime environment of the exemplary communication application design and execution platform 100 comprises a workflow execution layer containing a set of communication-centric extensions to an existing workflow engine and a communication management layer leveraging the Java 2 Enterprise Edition (J2EE) platform.

According to one aspect of the invention, discussed further below in the section entitled "Launching Conferences Based on Presence," methods and apparatus are provided for establishing a conference based on the presence or preferences (or both) of one or more invitees. In one implementation, a medium is selected for a conference being established based on presence and profile information, optionally including media preferences, for each invitee to the conference. In a further variation, the selected media type for the conference must also support the requirements of the conference, such as document sharing. In this manner, the same communication application can trigger conferences of different media types (where the selected media type is most likely to lead to the successful establishment of the conference). In another variation, the conference must support the availability of specific artifacts/documents before the conference call can be established.

The exemplary communication application design and execution platform 100 models communication applications as workflows, also referred to as flows, over application entities modeling users and communication sessions. The flows represent communication applications as compositions of task nodes, where task nodes represent units of communication activity. The model enables powerful applications, utilizing properties such as presence over groups of users and various media, to be developed easily. The present invention may be implemented using a conventional workflow engine, such as the IBM Process Choreographer™, as modified herein to provide the features and functions of the present invention. Generally, the conventional workflow engine is extended herein to support the addition of communication tasks to a workflow. In particular, the conventional workflow engine is extended to process communication nodes in a workflow.

Initially, a discussion will be provided of the exemplary communication application development and execution platform 100 that supports the development of many types of communications applications, including applications that launch conferences based on presence in accordance with the present invention. It is noted, however, that many of the features of the communication application development and execution platform 100 are not essential to the present invention and the present invention may generally be implemented in any processor-based system that allows a conference to be initiated based on presence information, as would be apparent to a person of ordinary skill in the art. In addition, while the present invention is described in the context of a workflow engine, the present invention may be applied in any context where conferences are initiated, as would be apparent to a person of ordinary skill in the art.

Communication Applications

Figure 2:
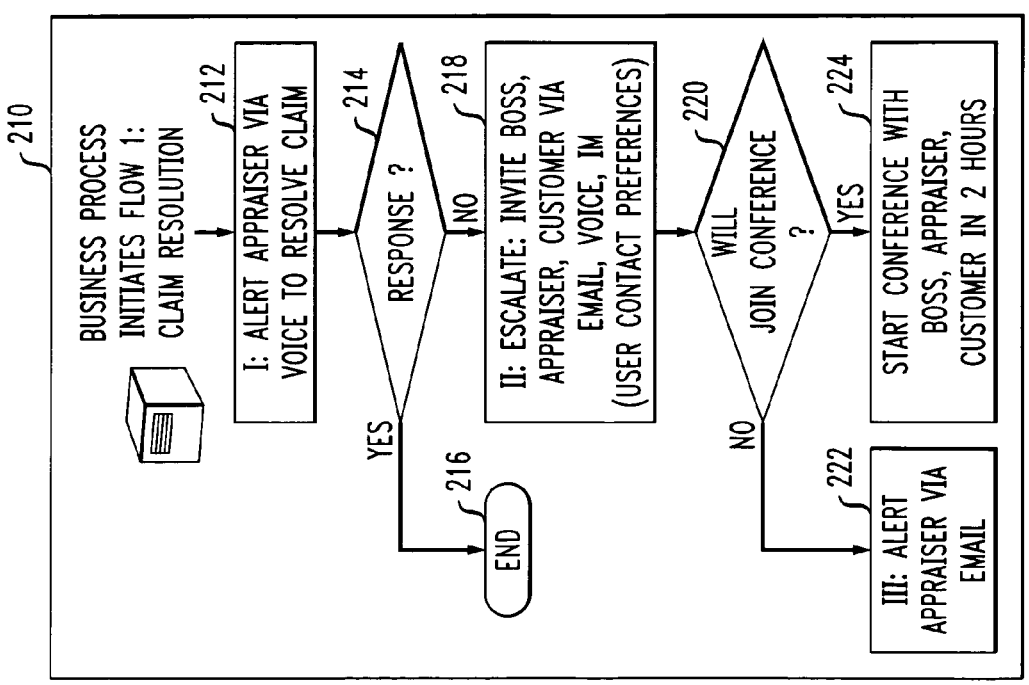
FIG. 2 illustrates an exemplary application that demonstrates the need for the present invention.

Communication applications involve interactions between communication servers, devices and people. Recently, the need for carefully orchestrated complex communication applications has increased, especially in enterprises where the need to contact and connect the right group of people at the right time, via the right communication medium, and with the right content is critical. FIG. 2 illustrates an exemplary application 200 that reflects the intricacies and complexities of today's communication needs. While the exemplary application 200 revolves around the timely resolution of an auto insurance claim by people such as a claim appraiser and an auto collision expert, other contexts, such as a hospital scenario where a resident doctor, a nurse and a specialist collaborate for consultation on a patient's health or a business context where the right set of executives need to alerted and brought into a conference when the company's stock price changes by a large amount in a short period of time could also be chosen.

The application 200 brings a group of users together to solve an issue. The issue is critical, specialized, and time-sensitive; it is imperative that the right users using different types of media and modalities (e.g., voice, IM, email) be contacted based on a combination of presence and availability information, user rules and enterprise policies, and all the other information stored in the entity relationship model. In addition, the application 200 collects responses from the users, makes decisions based on the responses and brings users into a shared environment using conferencing. The notion of presence includes all means of presence known to the application 200. These may come from disparate sources and may include presence on IM, presence on a web portal, presence on a conference, i.e., any channel that is tracked or information about which can be queried by the application. It is noted that presence information may be collected for a number of media types, including those that support conferencing. For example, IM presence, SIP presence, and PBX presence (i.e., being on a conference supported by PBX), are of particular interest because they can be used to trigger a conference based on the kind of presence.

As shown in FIG. 2, the application 200 comprises three independent processes or flows 210, 230, 250. The deadline for resolving an insurance claim is a short interval (say, 24 hours) away. A business process can detect this condition and trigger a first flow 210 to resolve the claim. In the claim resolution flow 210, a claim appraiser is first contacted during step 212 via voice in the exemplary implementation to render a menu driven voice message so that the appraiser can resolve the message immediately. The message gives brief information about the claim and states that more detailed information can be found if the appraiser logs into his user portal. If a response is received from the appraiser resolving the claim during step 214, no further action is required and the flow terminates during step 216.

If no response is received from the appraiser during step 214, the claim resolution flow 210 proceeds to escalate the problem during step 218 by sending invitations for a voice conference, to be started in say, 2 hours, to the appraiser's boss, the customer, and the appraiser. The application 200 sends the invitations using a combination of presence and availability information, user rules and enterprise policies as well as classification of the message (e.g. its importance). User rules include preferences that each user has set up in a personalized contact list that specifies how that user would like to be contacted at different times during the day. This may mean that, for instance, the boss receives the invitation via email, the appraiser via voice, and the customer via IM. The invitation can be a derived from a template that includes, for example, information about the claim and the expected duration of the conference. The recipients of the invitation can respond by either accepting or rejecting the invitation.

Once all responses have been received by the system or a time limit has elapsed for receiving all responses, the claim resolution flow 210 checks if a minimum number of people (say, 2) have accepted the invitation during step 220. If not, the claim resolution flow 210 sends a claim resolution reminder to the appraiser during step 222 via a high priority email message. If a minimum number of people have responded in the affirmative, the claim resolution flow 210 establishes a conference with the three invitees at the scheduled time of the conference during step 224. This conference is named Claim Conference. The claim resolution flow 210 is completed at this point. The best choice for the media type of the Claim Conference is based on the presence and preferences of the boss, appraiser, and the customer. A dynamic choice for the media type where the media type is determined at runtime is required because presence information is highly dynamic and the user preferences depend, at the least, on the user, the day of the week and the time of day.

During the Claim Conference, the boss realizes that an auto collision expert is needed to answer some of the questions that the customer is posing. However, there are many auto collision experts in the company and the boss does not know who may be available to join the conference. The boss then initiates an expert identification flow 230, which sends out invitations during step 234 to all users identified as auto collision experts and as available to immediately join the ongoing Claim Conference. If it is determined during step 238 that no expert responds to the invitation within a configured time limit, the boss needs to be alerted that no expert is available during step 242. The system uses presence information it has already collected that the boss is present on an ongoing conference and opts to send a "whisper" on the same channel that she is using for the Claim Conference. If the Claim Conference is a voice conference, the whisper is a message rendered as speech and is audible only to the recipient, not the other conferees. If the Claim Conference is an IM conference, the whisper is a message that is rendered as an IM message to the recipient only. If an expert responds to the invitation, the boss is alerted, during step 246, as a whisper, that an expert is available and the expert automatically bridged into the conference.

A third flow, referred to as an appointment alert flow 250, is initiated by the appraiser's calendar program. A previously scheduled appointment on the appraiser's calendar is about to begin and the reminder for that appointment is sent during step 260 as a whisper on the channel that the appraiser is using for the Claim Conference. As the exemplary auto insurance application 200 illustrates, communication applications have moved beyond a simple voice call or email and it is tedious and complicated to build such applications.

As previously indicated, the communication application development and execution platform 100 models communication applications using a workflow model where communication activities and decision nodes are composed in a directed graph to form a communication flow. Communication activities model high-level abstractions of communication services such as alerts, gathering responses, and conferencing. Decision nodes access the information in the entity relationship model to provide branching and looping within communication flows. In addition, specialized nodes to access external databases and suspend flows to wait for user input may also exist.

As shown in FIG. 1, the communication application development and execution platform and execution platform 100 comprises a communication flow management layer 110 and a communication management layer 150. The flow management layer 110 is responsible for the communication flows and consists of a workflow engine 120 with communication-centric extensions responsible for the execution of communication activities. The flows are compositions of services offered by the communication management layer 110. The communication management layer 150 performs the session, relationship, resource, request, and other types of management, as discussed further below in a section entitled "Communication Management Layer."

The underlying communication infrastructure encompasses a variety of communication servers, such as voice switches, email and IM servers. The platform relies on enterprise directories that store user information and enterprise policies. The platform can access additional external presence, availability, and location servers, if needed.

Communication Flow Management Layer

The communication flow management layer 110 is responsible for the creation, storage, and execution of the flows. As shown in FIG. 1, the communication flow management layer 110 comprises an application development environment (ADE) 115 that allows flows to be designed, a flow store 125 that stores the designed flows as flow specifications, a workflow engine 120 that interprets the flow specifications to execute them and a communications task library 130 that contains the modules corresponding to each type of node in the flows.

In the exemplary implementation, the application development environment 115 is based on the open source Eclipse platform and provides a palette of task nodes, each of which can be selected, dragged and dropped into a communication flow. Each selected node can be configured for communication-specific properties using the communications task library 130. The flow store 125 consists of XML representations of the flows. The workflow engine 120 executes the composition of disparate communication services as a flow. As used herein, the term flow is used instead of workflow in order to distinguish typical business processes, such as document management, from communication processes. A workflow is defined by the Workflow Management Coalition (WFMC) as "the automation of a business process, in whole or part, during which documents, information or tasks are passed from one participant to another for action, according to a set of procedural rules."

Generally, a workflow is the operational aspect of a work procedure: how are the tasks are structured, who performs them, what is their relative order, how are they synchronized, how does the information to support the tasks move and how are tasks tracked. The concept of workflows is adapted for communications by defining a communication flow to be the automation of a set of communication tasks between one or more participants according to a set of procedural rules.

The WFMC defines a workflow management system as a system that defines, creates and manages the execution of workflows through the use of software, running on one or more workflow engines, which is able to interpret the process definition, interact with workflow participants and, where required, invoke the use of IT tools and applications. Such a system consists of software components to store and interpret process definitions, create and manage workflow instances as they are executed, and control their interaction with workflow participants and applications. It also provides administrative and supervisory functions. In the communication middleware platform, the workflow management system is comprised of the workflow engine and a communication tasks library.

Communication Flows

Figure 3:
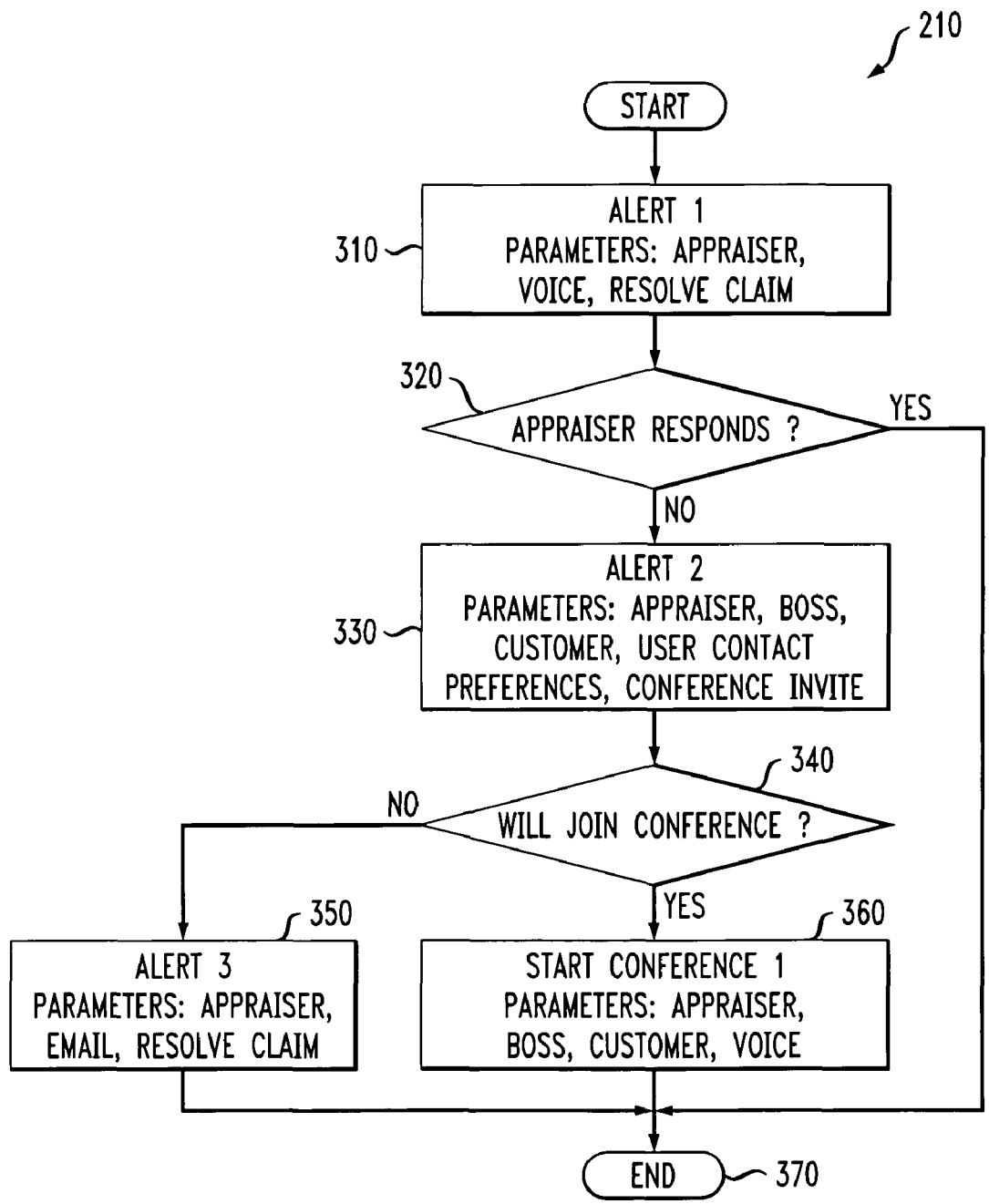
FIG. 3 is a flow chart describing the claim resolution flow of FIG. 2 in further detail.

Communication flows are compositions of task nodes in a directed graph. FIG. 3 is a flow chart representation of the claim resolution flow 210 of FIG. 2. A shown in FIG. 3, the claim resolution flow 210 initially sends an alert to a claim appraiser during step 310. The parameters of the communication may specify that the appraiser be contacted via voice to resolve a claim. The message may give brief information about the claim and state that more detailed information can be found if the appraiser logs into his user portal. If a response is received from the appraiser resolving the claim during step 320, no further action is required and the flow terminates during step 370.

If no response is received from the appraiser during step 320, the claim resolution flow 210 proceeds to escalate the problem during step 330 by sending a second alert. The parameters of the second communication may specify that the appraiser, his or her boss and the customer be contacted in accordance with their corresponding preferences to invite them to a conference. The invitation can be derived from a template that includes, for example, information about the claim and the expected duration of the conference. The recipients of the invitation can respond by either accepting or rejecting the invitation.

Once all responses have been received by the system or a time limit has elapsed for receiving all responses, the claim resolution flow 210 checks if a minimum number of people have accepted the invitation during step 340. If not, the claim resolution flow 210 sends a claim resolution reminder to the appraiser during step 350 via a high priority email message. If a minimum number of people have responded in the affirmative, the claim resolution flow 210 determines all presence information (on different devices) and the user preferences for the invitees. Each medium and device that the user is present on supports a set of capabilities such as document sharing. The claim resolution flow 210 selects a media type by using the following rules. Initially, among the media where the users are present, a most common medium is selected that supports all required capabilities for the conference. In cases where there is more than one choice for the most common medium, then any medium that supports the requirements of the conference can be selected. (It is possible in some cases that only one invitee is present on the most common medium.) For all invitees that are present on that medium, the presence information will provide the device identification to contact the invitee. For all invitees that are not present on that medium, the user preferences can be looked up to retrieve the appropriate device information to contact the invitee.

If, however, there is no common medium that the invitees are present on, then the flow uses the user preferences of the invitees to determine the most common medium that is preferred for that day of the week and the (soonest) time of day and that supports the requirements of the conference. The flow then establishes a conference with the selected media type among the three invitees (boss, appraiser, customer) at the scheduled time of the conference during step 360. The claim resolution flow 210 is then completed at step 370.

A flow specifies the sequencing and synchronizing of communication activities in a standalone communication interaction. A set of flows defines a complete communication application and operates over a set of shared application entities such as the claim conference in the claim resolution flow 210. This allows the expert identification flow 230 in FIG. 2 to access the communication session corresponding to the claim conference that was set up by the claim resolution flow 210 and add the expert to the same claim conference.

Workflow Engine

The workflow engine 120 (FIG. 1) may be implemented in Java. The workflow engine 120 can be embodied using a commercial workflow engine as modified herein to provide the features and functions of the present invention. Workflows are represented using a markup language that is usually a derivative of XML, such as the Business Process Execution Language (BPEL). The communication flows can be stored in XML. The workflow engine 120 is capable of interpreting flow specifications and executing them. In addition, the workflow engine 120 provides administrative functions to manage flows and interfaces to invoke them.

Communication Application entities

Communication application entities are variables in a flow that store state. For each entity, there is a set of named attributes that store values for properties of the entity. Communication application entities and their attributes are associated with specific communication applications (sets of flows). For example, for the exemplary auto insurance application 200 in FIG. 2, some of the attributes for the appraiser may include unique handle; response to alert 1; presence on IM and presence on claim conference.

There are two types of communication application entities: users and communication sessions. Application entities have runtime representations in the entity relationship model and design time representations in the application development environment. An example of a communication session entity is a voice conference. Some of the attributes for a conference include session identifier that uniquely identifies the session; descriptive name of the conference; invitees to the conference; host of the conference; participants in the conference (may be different from invitees if everyone in the invitee list does not join the conference); start time of the conference; end time of the conference; and privileges for the participants.

The exemplary auto insurance application 200 requires four user entities: appraiser, boss, customer, and expert and one communication session entity: claim conference.

Application entities are coupled to the task nodes in a flow by being associated with the properties of the task node. For instance, the list of recipients of alert 2 in FIG. 2 (step 218) is appraiser, boss, and customer. A task node may change the state of an application entity by changing the value of an attribute in the application entity. For example, alert 2 in FIG. 2 may change the response attributes of the appraiser, boss, and customer if these users have responded to the alert. Task nodes may also access the values for the attributes in application entities. The decision node after the node for alert 2 checks the value of these attributes to decide whether or not to proceed to set up the voice conference. The application developer has to set up the application entities before designing the flows for an application. This allows the association of the entities with the task nodes in the application as the application is being designed.

Communications Task Library

The communications task library 130 contains modules for executing the different types of nodes in the communication application development and execution platform 100. This library 130 can be extended with new types of communication tasks without changing the workflow engine 120. The tasks may access different sources of information such as the entity relationship model. The tasks communicate with the communication manager 150 for service requests, such as sending an email or an IM message. Support for a new task can be incorporated by adding the modules corresponding to the new task to the library 130 and to the ADE 115. No change is required to the workflow engine 120.

For each task node, there is a set of properties/parameters that have to be configured during the design of the communication application. These properties and their values determine the behavior of the task node at execution time. To illustrate the nature of the communication nodes, the alert node and the voice conference node are discussed hereinafter. Similar designs exist for communication nodes, such as presence, IM conference and adding people to an existing conference.

The function of an alert node is to send a message to one or more users. While the underlying communication manager 150 and the communication switches may have separate components for media-specific alerts, such as an email message, an IM message or a voice message, the task node for the alert presents a unified view of an alert to provide a level of abstraction intended to facilitate the easy development of communication applications. The goal is to present unified views of communication capabilities that may be implemented in different ways on different servers. Some of the properties of the alert node include recipients (user application entities); message and its importance; any application context for message (other application entities, e.g. the customer's name and information in the claim resolution flow 210 in FIG. 2 may be sent as part of the message); time for delivery of message; whether presence can be used for delivery of message (optional); choice of media (email/IM/voice) for delivery of message (optional); and timeout for checking for responses to message.

If presence is to be used for the delivery of a message, the alert task node queries the entity relationship model in the underlying communication manager 150 for presence information relating to each of the recipients and accordingly selects the media for delivery of the message. If both presence and a specific media are not chosen for the delivery of the message, the alert node defaults to using the user contact preferences for each of the users.

The message of an alert node may be a dialog script if the alert is delivered using a voice connection or a web-based response template if the alert is delivered over IM or email. Responses to the alert are collected by the underlying communication manager 150 and can be accessed by the task nodes in the flow layer 110.

The function of the conference node is to set up a conference among a group of people. Some of the properties of this node include conference application entity; name of conference; invitees to conference; start time for conference; and message and application context to be heard at start of conference. Additional details about the conference node are discussed below.

User Management

Users are a critical part of any communication application and the goal of any communication application is to enable a rich user experience. User data is typically stored in a directory-based structure and accessed through a protocol such as LDAP. User directories allow the storage of communication attributes for a user such as a unique handle, telephone number, email and IM addresses. Role-based attributes that show the skill of a user are particularly important so that role-based searches can be done and people with the right skills can be quickly contacted to resolve critical issues, for example, using the data mining techniques discussed further below in conjunction with FIGS. 5-9. Additionally, user preferences that indicate, for each user, the best way to contact the user at a given time are extremely useful in ensuring a smooth communication experience. Typically, an enterprise stores this type of information in directories. The entity relationship model either incorporates this information by copying it or accesses the appropriate directories on demand without copying the information.

Communication Management Layer

In the exemplary embodiment, the communication management layer 150 encompasses several J2EE components and some peripheral Java 2.0 Standard Edition (J2SE) components. The communication management layer 150 can be implemented as an extension of J2EE and can maximize the number of services performed by J2EE on behalf of the communication application development and execution platform 100.

API to Flow Management Layer

Figure 4:
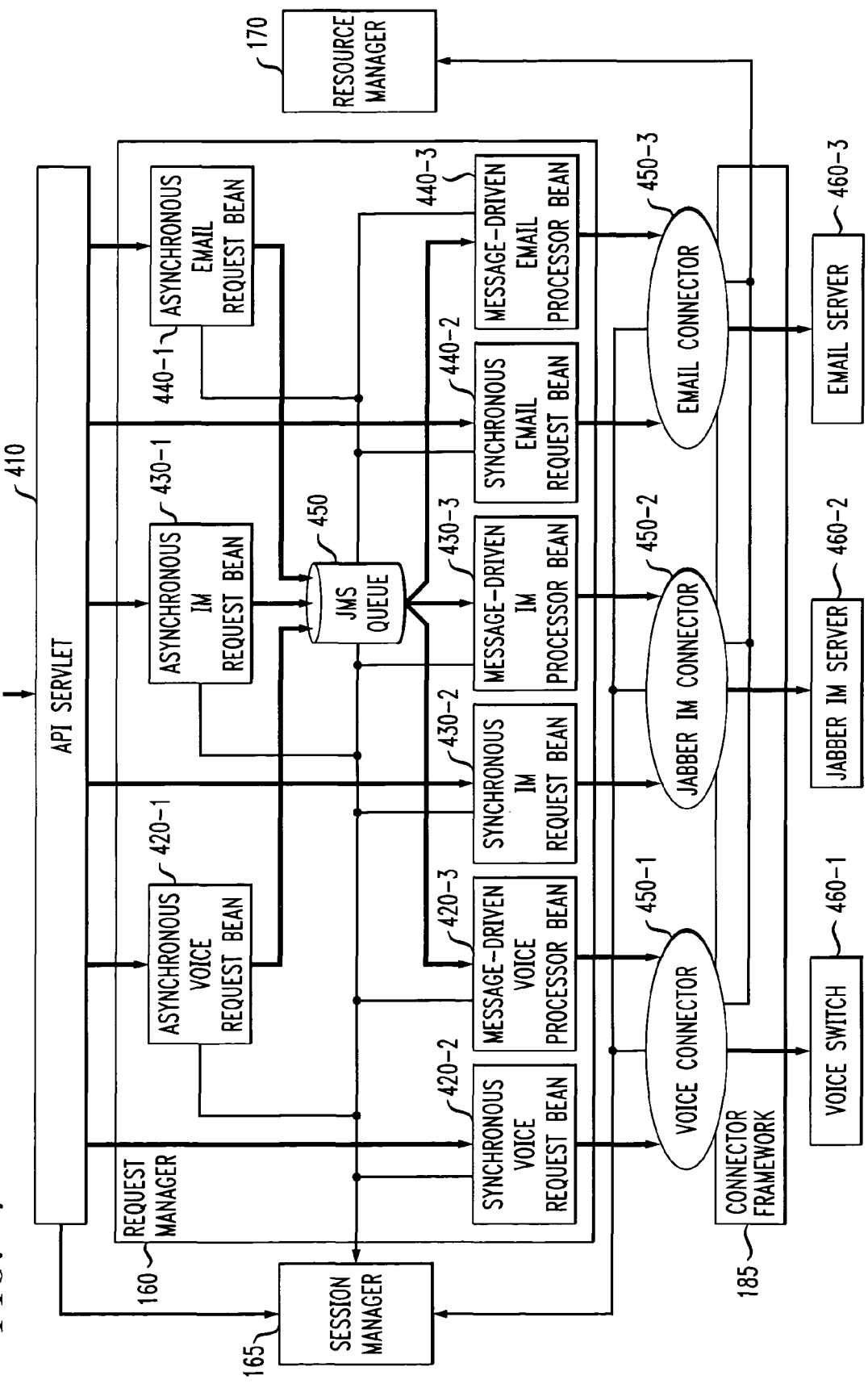
FIG. 4 is a schematic block diagram illustrating the interaction of the various components of the communication management layer of FIG. 1 in further detail.

FIG. 4 is a schematic block diagram illustrating the interaction of the various components of the communication management layer 150 of FIG. 1 in further detail. As shown in FIG. 4, the Communication Manager 150 offers an API 410 to the flow management layer 110 that can be implemented by a servlet. This API servlet 410 classifies the request either as a communication request or a request for entity relationship information and checks the request for syntactic and semantic validity. The servlet 410 hands over valid communication requests to the request manager 160 and all other valid requests to the entity relationship manager 165. For each valid request, the servlet 410 starts a J2EE UserTransaction that envelops all operations pertaining to this request. Eventually, the servlet 410 commits the UserTransaction or rolls it back in the case of an exception or a transaction timeout.

The illustrative communication application development and execution platform 100 thus delegates concurrency control to J2EE. Since J2EE currently does not permit the use of timers, the communication application development and execution platform 100 uses the UserTransaction and its timeout settings to also bound the time that a communication request spends waiting for fulfillment from the underlying communication infrastructure.

Request Manager

As shown in FIG. 4, the request manager 160 ties all other components in the communication manager 150 together. The request manager 160 contains three subcomponents voice requests 410, instant messaging requests 420, and email requests 430, respectively. The three subcomponents strongly resemble each other but accommodate different request parameters as required by the different media. Each subcomponent 410, 420, 430 has a synchronous, asynchronous and message-driven incarnation.

Entity Relationship, Manager

In the exemplary implementation of the communication application development and execution platform 100, a session is a single object. More specifically, it is an entity bean with container-managed persistence, so data persistence and distribution across servers in a clustered version of the communication application development and execution platform 100 is offloaded to J2EE. A session contains fields for the media type of the session (e.g., "voice conference"), the session name, a unique session ID, the session creation time as well as the session expiration time, and a hashtable that stores media-specific data such as the name of the VXML script to be rendered in the case of a first-party voice call or the conference name of an instant messaging conference. Users and their properties (phone numbers, instant messaging addresses, email addresses, etc.), endpoints (representing communication devices), activities, expertise, locations, projects are represented as entity beans with container-managed persistence as well. Sessions have relationships with users through endpoints because users are invited to sessions or currently participate in sessions and do so via a communication device. The relationship management is accomplished via the J2EE concept of container-managed relationships between the entities in the entity relationship model.

The API 410 that the communication management layer offers to the flow management layer contains complex queries on the relationship model. These queries are specified as part of the entity relationship manager but implemented by J2EE. Adding new queries thus is a very simple process, involving mostly configuration changes, that does not depend on the database used for storing the data that the entity relationship model holds.

As the connections between the entity relationship manager 165 and other components in the communication manager 150 in FIG. 4 indicates, the entity relationship manager 165 is a pivotal information repository. The session and relationship manager 165 receives data from the synchronous and asynchronous subcomponents of the request manager 160 that set up communication operations, disseminates data to the message-driven beans in the request manager 160 as well as the media-specific connectors in the connector framework, is queried by the API servlet 410, and stores many relevant events that the Event Manager collects from the underlying communication infrastructure (not shown in FIG. 4) and from external servers, services, devices, systems, and applications. Examples of such events are Jabber IM presence changes, conferees joining a voice conference or dropping off of a conference, and data gathered from users during interactive VXML script execution. The personal voice agents described below access entity relationship information directly without using the communication manager API 410.

Because J2EE does not allow the use of J2SE timers, a dedicated external J2SE program in the form of a J2EE application client performs periodic cleanup operations on the existing sessions and other entities. The cleanup is necessary in cases where participants of sessions leave sessions but software or hardware failures cause the relevant events to not get propagated to the entity relationship manager 165. For example, if the voice switch fails during an ongoing voice conference, the conferees will get disconnected but the entity relationship manager 165 will not get notified of the disconnect due to the switch failure.

Resource Manager

The resource manager 170 contains a set of components that are geared towards the specifics of the underlying communication infrastructure and that allow the communication application development and execution platform 100 to access the servers in that infrastructure. Access to the voice switch and the Jabber IM server may require components in the resource manager 170.

Media Enhancements and Event Manager

Generally, the media enhancements 175 and the event manager 180 are media-specific. It is noted, however, that the event manager 180 is comprised of a set of servlets that can be invoked by components in the underlying communication infrastructure. These servlets access certain beans in the communication manager 150, in particular, the beans of the entity relationship manager 165. The use of servlets is a natural fit for the event manager 180 because the current components in the underlying communication infrastructure that can report events to other systems have the ability to act as HTTP clients.

Connector Framework

To facilitate the addition of voice switches 460-1, instant messaging servers 460-2, and email servers 460-3 (collectively, communication servers 460) to the communication application development and execution platform 100, the connector framework 185 defines interfaces for J2SE classes 450-1 through 450-3 (connectors 450) that perform the translation from abstract service requests into concrete instructions for the communication servers. An example of an abstract service request for the voice connector is "place a call," with given parameters, whereas the sequence of concrete instructions in the voice connector implements the actual protocol to the voice switch that eventually places the call. Connectors can access additional resources in the resource manager 170. Such resource objects need to be tailored to the communication servers.

If the capabilities of a new communication server do not exceed those anticipated in the design of the request manager 160 or if new capabilities are present but need not be propagated to the flow management layer 110, adding the new communication server to the communication application development and execution platform 100 is a straightforward process. It consists of building the appropriate J2SE connector class according to the J2SE interface that the communication framework 185 contains, and additional resource classes if necessary. The communication framework 185 plus the resource manager 160 thus act as an abstraction layer that localizes communication server-specific code in the communication application development and execution platform 100.

Detailed Features

Media, Protocols, and Communications Operations

The exemplary implementation of the communication application development and execution platform 100 supports three communication media and protocols: voice using a proprietary protocol for a voice switch, instant messaging using Jabber IM, and email using IMAPI. The workflow programming interface offers the following communication operations:

Voice: placing first-party calls to sets of phone numbers with rendition of specified and interactive VXML scripts; placing third-party calls; setting up voice conferences with designated voice greetings and personal voice agents for conferees;

Instant messaging: sending instant messages to sets of recipients and setting up instant message conferences;

Email: sending emails to sets of recipients with the option of including attachments.

A framework with Java interfaces is defined that enables developers to add new communication servers implementing these three media with different protocols. To add a communication server with a different protocol, a specific Java interface must be implemented and the communication application development and execution platform 100 must be recompiled, reconfigured, and restarted. This framework is extensible so that developers can add communication servers implementing different communication media such as SIP, SMS, WAP or fax.

Abstraction, Integration and Convergence

The details of the protocols that are used to communicate with external servers 195, such as presence, availability and location servers, can be hidden from the applications. The level of programming abstraction can be elevated from dealing with, for example, ports on a voice switch or connection establishment with an instant messaging server to high-level tasks such as conference or IM message that developers connect with each other in flows. The flow programming interface incorporates all operations on the underlying media and on the components of the communication application development and execution platform 100 in one integrated environment.

Convergence of disparate media is accomplished through several features. For example, a user participating in a voice call can choose to have email and instant messages automatically rerouted to the call. When an email or instant message arrives for this user, he or she will be notified through a sound on the call and then the subject line of the message will be read to the user. Both the signal and the subject line rendition are audible only to the recipient. The communication application development and execution platform 100 introduces the notion of converged presence, which spans both instant messaging and voice calls. Thus, applications can query the presence status of a user and find out whether a given set of users is currently participating in an instant messaging or voice conference or in a voice call or have indicated that they are available to receive instant messages. Another example of convergence is the ability to access the entity relationship during an initiated voice conference, which allows a conferee to learn, for example, about the identities, and locations of other conferees, and the duration of the conference when the user joins.

Media Enhancements

The functionality of tasks is not necessarily backed by native capabilities of the underlying communication infrastructure. As a middleware platform, the communication application development and execution platform 100 can expand a task into an arbitrary set of operations on its own components and those of the underlying communication servers and thus offer more complex and more application-oriented media operations than what the underlying communication infrastructure implements. The convergence features described herein are examples of enhancements to the media functionality of the underlying communication infrastructure. Another example of media enhancements is the voice conferencing functionality that is not natively offered by the voice switch.

Synchronous and Asynchronous Request Management

The communication application development and execution platform 100 processes requests for media operations, such as call setup requests, either in a synchronous or in an asynchronous fashion. The synchronous mode is appropriate when mostly requests with short-term interactions with the underlying media are expected. In the asynchronous mode, all requests are queued up before processing occurs. Requests are transacted in the communication application development and execution platform 100. Thus, each request, synchronous or asynchronous, will be processed to completion once and exactly once, even across restarts of the communication application development and execution platform 100. In other words, no request will get lost and requests do not get duplicated even in the event of a server outage. However, if, during partial processing of a request, communication with the outside world has taken place before a restart, this communication will be repeated after the restart.

A flow issuing either a synchronous or asynchronous request always receives a session handle from the communication application development and execution platform 100 in response to the request. The session handle identifies the request and allows the flow to track the status of the user interactions resulting from the request. For example, when a flow requests the establishment of an instant message conference, it can later check, for example, which user is currently participating in the conference, how long the conference has been in progress, and whether it has terminated.

The communication application development and execution platform 100 is extensible for cases where a flow application requires feedback after the completion of an asynchronous request. To this end, the communication application development and execution platform 100 offers a Java interface that can be implemented by an application designer. After completion of an asynchronous request, the communication application development and execution platform 100 calls a method in the implementation class and passes details about the request processing to this method.

Communication Resource Management

Certain media operations and, in particular, media enhancements 175 require management of certain media resources outside the underlying communication infrastructure. To enable conferencing, for example, the communication application development and execution platform 100 administers port and port assignment objects that reflect the supported and currently available ports, respectively, on the voice switch that it uses for placing conference legs. The port assignment object for a given switch changes its state every time a call is placed and every time a conferee drops out of a conference. Before setting up voice calls, the communication application development and execution platform 100 selects from the ports that are supported by the voice switch but are not part of the currently assigned ports. In the requests for call setup to the voice switch, the communication application development and execution platform 100 needs to include the addresses of the selected ports. Conference establishment works similar but, in a second step, the communication application development and execution platform 100 instructs the switch to connect to one another the ports that carry the voice legs of the conference.

The technology that enables on-call alerts and rerouting of text messages to phones as explained above is called shared voice channels. Shared voice channels allow voice calls to be shared between phones and flows that want to send alerts to users or render text messages over established calls. A shared voice channel is a resource administered by the communication application development and execution platform 100. Among the administrative duties are establishment of shared voice channels, request routing to the appropriate shared voice channels, multiplexing their use among requestors, and connecting them to the personal voice agents of users.

Another example of a communication resource managed by the communication application development and execution platform 100 is an instant messaging client. The communication application development and execution platform 100 connects to an instant messaging server as a programmatic client that establishes a link to a Jabber server. This client initiates all instant messaging operations, such as sending instant messages, instant messaging conference establishment, and requesting instant messaging presence information. This client contains an event listener that receives notifications from the Jabber server about presence status changes for instant messaging users.

Session and Relationship Management

When the flow engine 120 requests a high-level communication operation, the communication application development and execution platform 100 creates a session object that carries parameters for the operation to various components in the communication application development and execution platform 100. Some of the parameters eventually become part of the sequence of requests to the underlying communication infrastructure that ultimately implement the high-level communication operation. Examples of sessions are voice calls and instant message conferences. Examples of parameters for, say, a voice conference session are the ports on the voice switch that carry the conferences, the configured voice greeting for conferees, the users invited to participate in this conference (invitees), the name of the conference and its setup time.

A session, however, not only stores static data pertinent to a communication operation but also dynamic data that flows may be interested in and can check for when querying the session object. Examples of such events are the current participants of a voice conference (active users). The set of active users is a subset of the set of invitees. Other examples are the termination time of a call or the feedback that a first-party call with an interactive VXML script gathered from a user. Thus, the communication application development and execution platform 100 not only initiates session objects with data but also collects dynamic data and propagates it to session objects.

The workflow programming interface contains predefined queries but for ad hoc queries flows can bypass the programming interface and execute the queries directly on the database representations of the entity relationship model. The entity relationship management directly supports complex reasoning about which user to communicate with, how, and when. An example of taking advantage of information presented by the entity relationship management is the determination that a specific user happens to be on a voice call initiated by the communication application development and execution platform 100 and the subsequent use of the shared voice channel feature to communicate with that user. An example of a more complex query supported by the entity relationship model would be "find all users who are currently not engaged in any activity and have expertise x and were part of the voice conference named y".

Currently, sessions are aligned with communication operations of potentially non-zero duration supported by the underlying communication infrastructure. However, flows could delineate sessions as well. This would enable flows to treat complex communications operations as objects of reasoning. An example of such a session would be sending out conference invitations to users via a variety of media, followed by the conference itself, followed by a post-conference email to all conference participants. This generalized notion of sessions would also allow navigable hierarchies of sessions.

Launching Conferences Based on Presence

Figure 5:
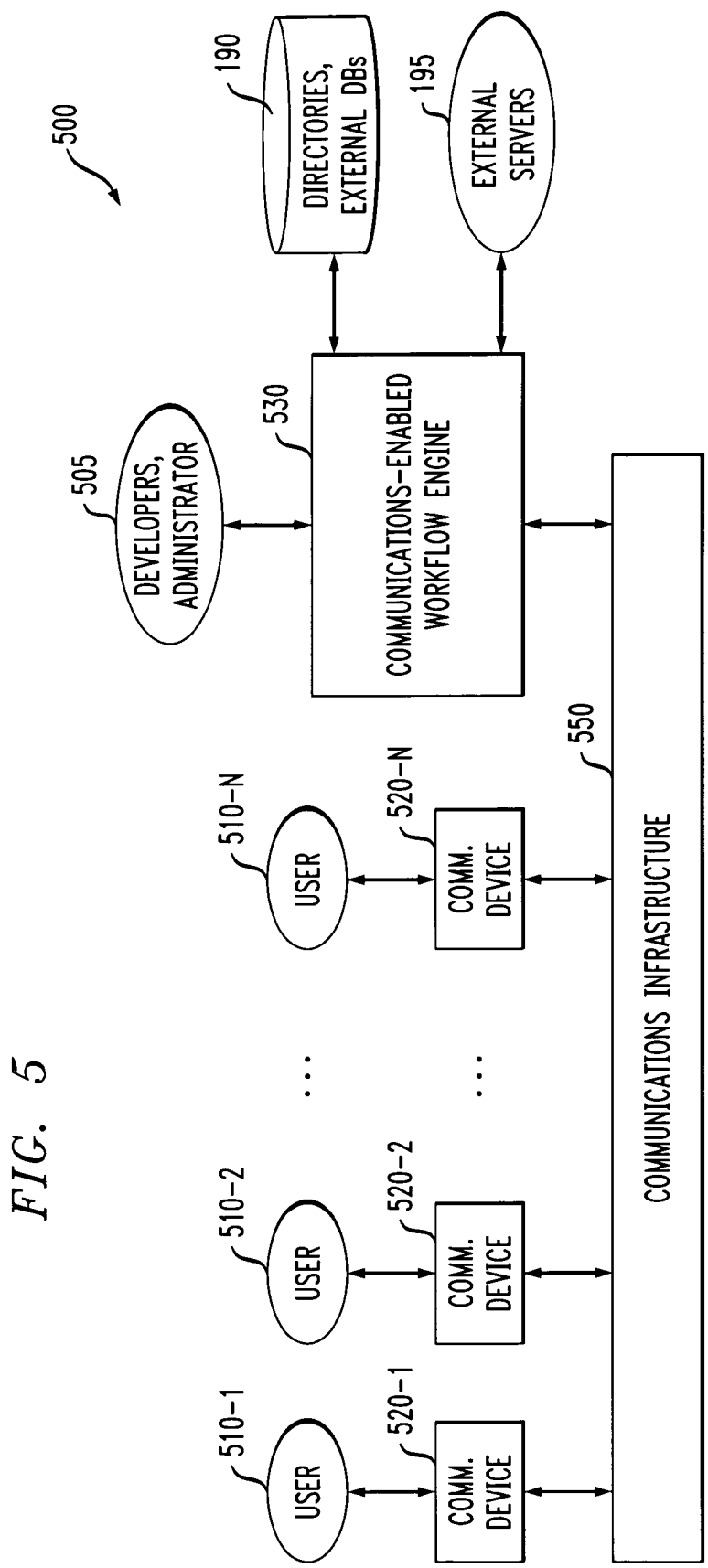
FIG. 5 illustrates a network environment in which the present invention can operate.

FIG. 5 illustrates a network environment 500 in which the present invention can operate. As shown in FIG. 5, a workflow engine 530 allows a developer or administrator 505 to generate or configure workflows that include one or more nodes that contact one or more users 510-1 through 510-N (collectively, users 510) that employ corresponding devices 520-1 through 520-N (collectively, devices 520). The devices 520 may be embodied, for example, as POTS or SIP telephones, a web browser, or an IM, email or SMS client. As previously indicated, the communication application design and execution platform 100 automatically configures the communication tasks so that details of the communications infrastructure 550 are addressed. The communications infrastructure 550 may include, for example, POTS, SIP, IM, email, WAP, SMS and Internet services and networks.

Figure 6:
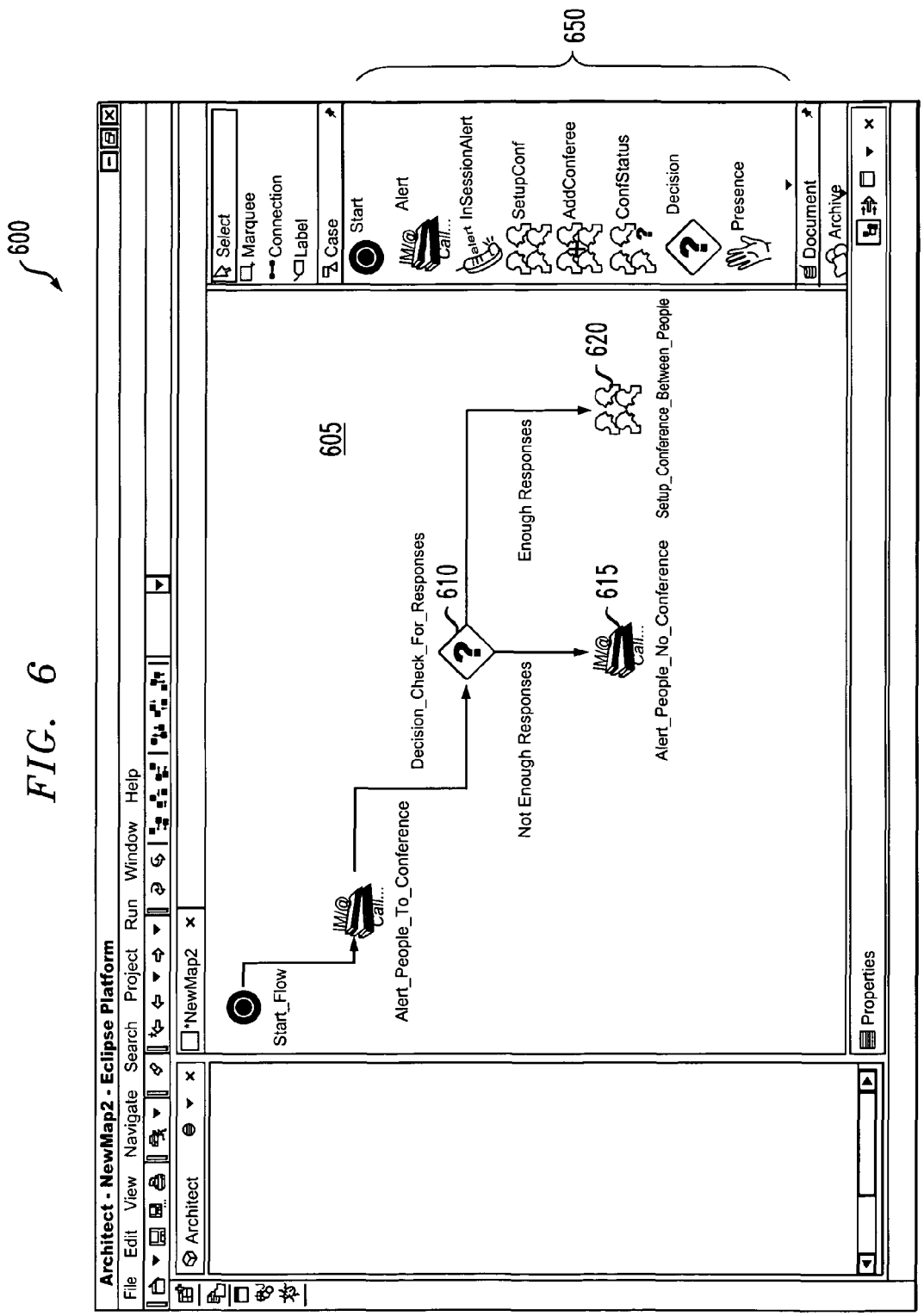
FIG. 6 illustrates an exemplary graphical user interface that may be employed to define parameters of a communication tasks.

FIG. 6 illustrates an exemplary graphical user interface 600 that may be employed to define communications tasks, such as the initiation of a conference. As shown in FIG. 6, a user has inserted nodes 615, 620 into a workflow following each branch of a decision node 610. If the decision node 610 determines that there are not enough responses to a request to set up a conference (according to some threshold), then an alert message is sent according to node 615 indicating that the conference has been cancelled. If the decision node 610 determines that there are enough responses to the request to set up a conference (according to some threshold), then the conference is established according to node 620. The properties dialog box to configure the node 620 is discussed below in conjunction with FIG. 7.

The function of a conference node 620 is to initiate a conference between a group of users (the "invitees"). While the underlying communication manager 150 and the communication switches may have separate components for media-specific conferences, such as a SIP conference or an IM conference, the task node 620 for the conference presents a unified view of the conference to provide a level of abstraction intended to facilitate the easy development of communication applications. The goal is to present unified views of communication capabilities that may be implemented in different ways on different servers. Some of the properties of the conference node 620 include a descriptive name of the conference, invitees to the conference, the time for initiating the conference, host for the conference, access rights for the participants (such as "are the participants allowed to speak or interrupt"), access rights for the host (e.g., can the host mute a participant or eject a participant), quorum (minimum number of participants) and requirements on the conference (e.g., document sharing, video link). These properties can be specified, for example, using the dialog box 700 to configure the node 620, as discussed hereinafter.

Figure 7:
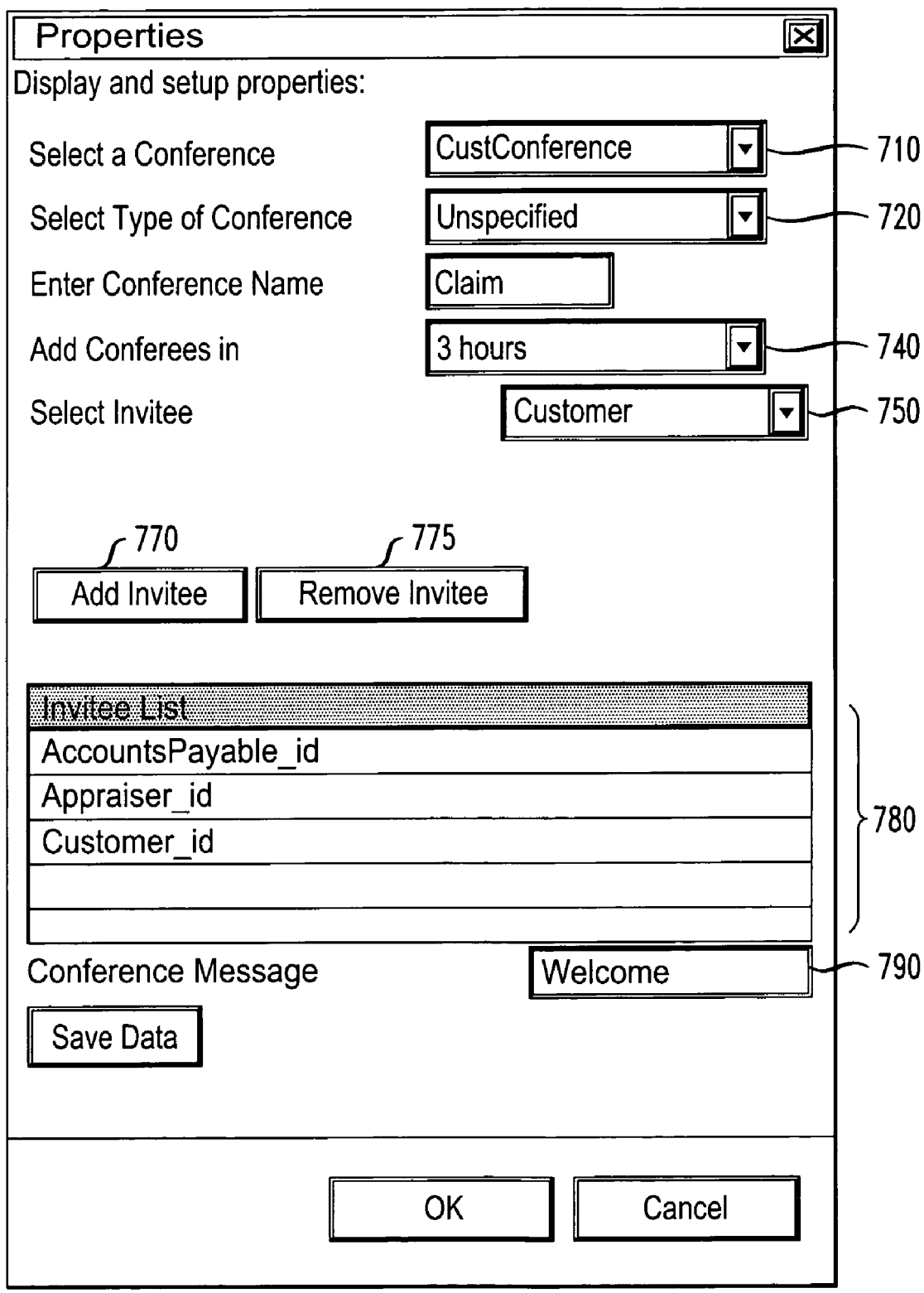
FIG. 7 illustrates an exemplary properties dialog box for configuring the setup conference node of FIG. 6.

FIG. 7 illustrates an exemplary properties dialog box 700 for configuring the setup conference node 620 of FIG. 6. As shown in FIG. 7, the properties dialog box 700 includes fields for specifying a particular conference in field 710, a conference type (i.e., media type) in field 720, a conference name in field 730, and the start time of the conference (relative to current time in exemplary embodiment) in field 740. Invitees can be added or deleted to the invitee list 780 by employing buttons 770, 775, respectively. The content to be presented at the initiation of the conference is illustrated in field 790.

As previously indicated, one aspect of the invention allows a conference to be established based on the presence or preferences (or both) of one or more invitees. In one implementation, a media type, such as voice or IM, is selected for a conference being established based on presence and profile information for each invitee to the conference. In a further variation, the selected media type for the conference must also support the requirements of the conference, such as document sharing. Thus, the same communication application can trigger conferences of different media types (where the selected media type is most likely to lead to the successful establishment of the conference). It is noted that the establishment of a conference based on the presence or preferences (or both) of one or more invitees is not limited to conferences established in connection with a workflow, as would be apparent to a person of ordinary skill.

As shown in FIG. 7, according to one aspect of the present invention, when the conference type (i.e., media type) specified in field 720 is left blank or an appropriate option such as "unspecified" is selected, the conference will be established based on the presence or preferences (or both) of one or more invitees. For example, the conference type field 720 may allow a media type of "voice," "IM," or "unspecified" to be selected. When the "unspecified" option is selected, a particular media type, such as voice (PBX, SIP) or IM, is selected for the conference upon establishment based on presence and profile information for each designated invitee to the conference.

Figure 8:
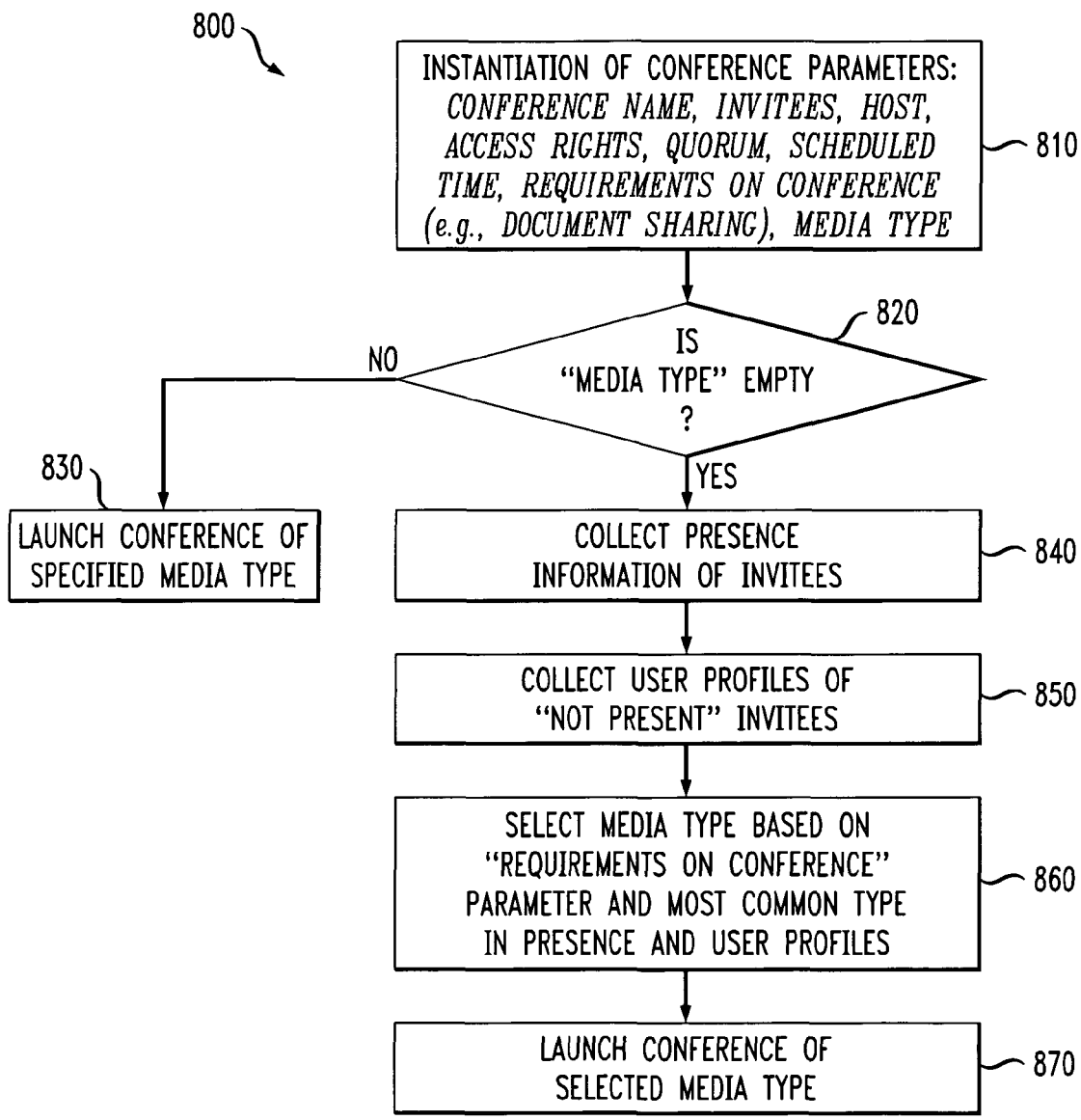
FIG. 8 is a flow chart describing an exemplary implementation of a presence-based conference initiation process.

FIG. 8 is a flow chart describing an exemplary implementation of a presence-based conference initiation process 800. As shown in FIG. 8, the presence-based conference initiation process 800 initially obtains, during step 810, the Conference Parameters specified by the designer, for example, using a properties dialog box 700 (FIG. 7). For example, as described above, the dialog box 700 may allow the designer to specify a Conference Name, Invitees, Host, Access Rights, Quorum, Scheduled Time, Requirements on Conference (such as Document Sharing) and the Media Type.

A test is performed during step 820 to determine if the "Media Type" field 720 is empty. If it is determined during step 820 that the "Media Type" field 720 is not empty, then a conference with the specified Media Type is launched during step 830, in a known manner.

If, however, it is determined during step 820 that the "Media Type" field 720 is empty (or an option of "unspecified" is selected), then presence information for the invitees is collected during step 840. For a discussion of suitable techniques for collecting such presence information, see, for example, U.S. patent application Ser. No. 10/672,633, entitled "Method and Apparatus for Delivering a Voice Mail Message With an Indication of the Presence of the Sender," or U.S. patent application Ser. No. 10/672,635, entitled "Programmable Presence Proxy for Determining a Presence Status of a User," each assigned to the assignee of the present invention and incorporated by reference herein.

In addition, user profiles of those Invitees who are not currently present on a device are collected during step 850. Generally, the user profiles are evaluated to determine if the invitee has specified any media type preferences for conferences or any availability information.

Thereafter, during step 860, a Media Type is selected based on, for example, the "Requirements on Conference" Parameter specified by the designer and the most common type in Presence and User Profiles, as determined during steps 840 and 850, respectively. A conference of the selected Media Type is then launched during step 870.

Initially, among the media where the users are present, a most common medium is selected that supports all required capabilities for the conference. In cases where there is more than one choice for the most common medium, then any medium that supports the requirements of the conference can be selected. (It is possible in some cases that only one invitee is present on the most common medium.) For all invitees that are present on that medium, the presence information will provide the device identification to contact the invitee. For all invitees that are not present on that medium, the user preferences can be looked up to retrieve the appropriate device information to contact the invitee.

If, however, there is no common medium that the invitees are present on, then the flow uses the user preferences of the invitees to determine the most common medium that is preferred for that day of the week and the (soonest) time of day and that supports the requirements of the conference.

In further variations, further rules can be evaluated during step 860 to make a media type selection based on invitee presence and preference information. For example, a media type can be selected based on the media type having the greatest number of invitees present, provided that the selected media type satisfies the quorum and other conference requirements. In yet another variation, the presence or preferences of the invitees can be prioritized, for example, to emphasize the preferences of the host or based on an enterprise hierarchy.

Connector Framework

Request Abstraction

Flows in the communication application development and execution platform 100 issue abstract requests for communication services. Such requests travel through several layers of the software of the communication application development and execution platform 100 before arriving at the underlying communication infrastructure that carries out the requests. While a request traverses the software layers of the communication application development and execution platform 100, the level of abstraction of the request decreases and the level of specificity with respect to the underlying communication infrastructure increases. When the request crosses the boundary between the communication application development and execution platform 100 and the underlying communication infrastructure, the original abstract communication request has thus expanded into a low-level dialog between the communication application development and execution platform 100 and the underlying service or server according to the API and/or protocol of that service or server.

Connector Framework

For each type of supported communication medium (e.g., voice or IM), the request manager 160 contains a subcomponent that deals with requests concerning this communication medium. Such a subcomponent eventually instantiates a connector that includes the code for carrying out the required dialog with a specific communication service or server. A connector is a J2SE class that implements a media-specific J2SE connector interface that is part of the connector framework 185. The connector framework 185 contains the connector interfaces, the connectors, and all the logic that is necessary to instantiate and execute the connectors upon request by the request manager 160. The connector architecture aims to minimize both the skill set required by a developer to build a new connector as well as the amount of work that building a new connector requires. Because of the first goal, the exemplary connectors are embodied as J2SE classes rather than much more complicated J2EE classes.

Whenever it is desirable to connect the communication application development and execution platform 100 to a new underlying communication service or server, a new connector needs to be built that matches the API or protocol of the service or server. The functionality of the connector is mandated by abstract methods in the corresponding connector interface. It may, in some cases, also be advantageous to build some additional support logic outside the connector class and access the support logic from within the connector class. The connector framework 185 allows this possibility.

Voice and IM Connectors

The following is the exemplary connector interface for connectors that deal with voice requests in the communication application development and execution platform 100:

```
public interface CallProcessor extends Serializable
{
    ContactResult callSecure(MercuryUserLocal destinationMercuryUser,
DialogDescriptor dialog,
MediaSessionLocal session,
int numberParticipants,
boolean isConference,
boolean addToExistingConference,
String conferenceName);
    ContactResult callNonsecure(MercuryUserLocal destinationMercuryUser,
    DialogDescriptor dialog,
    MediaSessionLocal session,
```

```
    int numberParticipants,
    boolean isConference,
    boolean addToExistingConference,
    String conferenceName);
        String getProcessorName( );
}
```

It contains only three methods, the first two of which have the same functionality but one does it with a secure data connection to a voice switch and the other with a nonsecure data connection. These two methods establish a voice link between the switch and a single user, potentially as part of a voice conference (one that either needs to be established or has been established already). The third method returns the name or type of the voice switch that handles a given voice request. All the data types in the interface that are not standard J2SE or J2EE are implemented in the connector framework 185. It is noted that the connector framework 185 in conjunction with the request manager 160 not only defines these data types but also instantiates objects of these data types based on a specific request, instantiates voice connectors (classes that implement the voice interface above), passes parameters to the methods of a voice connector, and handles the sequencing of invocations of callSecure/callNonsecure if several voice links to several users need to be established (either as part of a voice broadcast or as part of a voice conference). The connector framework 185 in conjunction with the request manager 160 thus implements much of the logic that otherwise the developer of a voice connector would have to implement.

The exemplary communication application development and execution platform 100 contains one predefined voice connector. It is designed for the Avaya Conversant voice switch. The call(Non)secure method in this connector contains Conversant-specific logic such as keeping track of voice port assignments in the Conversant, querying the Conversant voice port assignments to determine which ports are available to establish a voice call, reserving one or more selected voice ports, and issuing the instruction to the Conversant via HTTP to establish a voice call with given parameters.

The following is the connector interface for connectors that deal with instant messaging requests in the communication application development and execution platform 100:

```
    public interface IMProcessor extends Serializable

{
    ContactResult sendMessageSecure(MercuryUserLocal originator,
String userAgentName,
MercuryUserLocal recipient,
String server,
int serverPort,
String messageSubject,
String messageBody);
        ContactResult sendMessageNonsecure(MercuryUserLocal originator,
    String userAgentName,
    MercuryUserLocal recipient,
    String server,
    int serverPort,
    String messageSubject,
    String messageBody);
        ContactResult createConferenceSecure(String conferenceName,
String conferencePassword,
MercuryUserLocal originator,
String server,
int serverPort,
String conferenceServiceName);
    ContactResult createConferenceNonsecure(String conferenceName,
    String conferencePassword,
    MercuryUserLocal originator,
    String server,
    int serverPort,
    String conferenceServiceName);
        ContactResult
        inviteConferenceParticipantSecure(String conferenceName,
MercuryUserLocal originator,
MercuryUserLocal invitee,
String server,
int serverPort,
String conferenceServiceName,
String invitationMessageBody);
ContactResult inviteConferenceParticipantNonsecure(String
conferenceName,
    MercuryUserLocal originator,
    MercuryUserLocal invitee,
    String server,
    int serverPort,
    String conferenceServiceName,
    String invitationMessageBody);
        ContactResult leaveConferenceSecure(String conferenceName,
MercuryUserLocal originator,
String server,
int serverPort,
String conferenceServiceName);
    ContactResult leaveConferenceNonsecure(String conferenceName,
        MercuryUserLocal originator,
        String server,
        int serverPort,
        String conferenceServiceName);
            ContactResult
            requestPresenceUpdatesSecure(MercuryUserLocal
originator,
        MercuryUserLocal recipient,
        boolean subscribe,
        String server,
        int serverPort);
            ContactResult
            requestPresenceUpdatesNonsecure(MercuryUserLocal
    originator,
        MercuryUserLocal recipient,
        boolean subscribe,
        String server,
        int serverPort);
            String getProcessorName( );
    }
```

The IM connector interface is somewhat analogous to the voice connector interface, as would be apparent to a person of ordinary skill in the art. Each method has a secure and a nonsecure incarnation, and non-J2SE and non-J2EE data types are defined in the connector framework 185. The connector framework 185 in conjunction with the request manager 160 instantiates objects of these data types, instantiates connectors that implement the IM interface, passes parameters to the connector, and handles the sequencing of repeated invocations of the same method for different IM recipients if necessary (IM broadcasts or IM conferences).

The need for an IM connector interface in addition to a voice connector interface is based on the fact that instant messaging and IM conferences work very differently than voice calls and conferences on an abstract level as well as on a protocol level. The same reason explains the presence of other connector interfaces in the communication application development and execution platform 100, such as a connector interface for email. The exemplary communication application development and execution platform 100 contains one predefined IM connector. It is defined for the Jabber IM protocol. The Jabber IM connector in the communication application development and execution platform 100 emulates a Jabber IM client that can send instant messages to other IM users, it can set up Jabber IM conferences, issue IM conference invitations, and request notification of presence changes for other IM users.

As a Jabber IM client, the Jabber IM connector in the communication application development and execution platform 100 receives notifications of presence changes from a Jabber IM server (e.g., a user joining a Jabber IM conference initiated by the communication application development and execution platform 100 or not, a user leaving a Jabber IM conference, or a user launching a Jabber IM client) and has to propagate these presence changes back to the session manager of the communication application development and execution platform 100. This presents a technical challenge because Jabber IM conferences and connections between Jabber IM clients and a Jabber IM server are generally distinguished by the communication application development and execution platform 100 through a session ID that the communication application development and execution platform 100 creates and that the Jabber standard does not accommodate.

For example, the communication application development and execution platform 100 might set up a conference with session ID 10. To this end, the connector framework 185 in conjunction with the request manager 160 sends out Jabber conference invitations to the designated conference participants. When the latter eventually join the IM conference, the Jabber IM connector in the communication application development and execution platform 100 will receive corresponding conference presence changes from the Jabber IM server. The communication application development and execution platform 100 now needs to know which conference it is receiving these presence changes for. In other words, the communication application development and execution platform 100 needs to know the session ID 10 that is associated with the conference. The solution that the Jabber IM connector in the exemplary communication application development and execution platform 100 uses is embedding the session ID into the Jabber IM conference name. The embedding is done by appending "|10" to the conference name. The Jabber server propagates the conference name as well as the Jabber user ID back to the Jabber IM connector of the communication application development and execution platform 100 every time the user changes his conference presence status. The IM connector then factors the session ID out of the conference name by retrieving the number that follows the "|" symbol at the end of the conference name. The session manager of the communication application development and execution platform 100 can then change the status of the user in the session object with session ID 10, for example, from invited to participating.

Data Stored by Flow Layer 110

As previously indicated, the communication flow management layer 10 maintains an enterprise directory 190 containing a number of databases, such as user profiles roles, preferences and enterprise rules. In one exemplary implementation, the user profiles in the enterprise directory 190 contain the following records: user identifier; user name (first name, last name); location; address; contact addresses for variety of media (such as email, IM, SIP, workplace phone, home phone and cell phone) and preferred contact medium for different times of day (such as weekdays 8 am-5 pm: work phone, 5 pm-8 pm: cell phone, 8 pm-8 am: home phone; Weekends: cell phone).

In addition, user profiles are also maintained in the flow database to associate users with sessions. In one exemplary implementation, the user profiles in the flow database contain the following records: user identifier; user name; sessions in which user is a participant/invitee; and information relating to each session (such as responses; when the user joined and left the session; and level of control for the user, such as host or participant).

In addition, the flow database maintains session profiles to record information about each session. In one exemplary implementation, the session profiles in the flow database contain the following records: session identifier; name; type, such as conference or alert; SubType, such as IM, voice or email; invitees; participants (and optionally, whether they are active or inactive); start and end time; status (such as not yet started, alive, suspended or over); duration; session-related business workflow data; and subsession identifiers.

A set of communication flow profiles are also maintained to record flow information. In one exemplary implementation, the communication flow profiles contain the following records: flow identifier; status (such as executing or suspended); start node; current node; next node; communication users in a flow; communication sessions in a flow; and subflows.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   executing, at a communications server, a communication flow that identifies a first conference invitee and at least one second conference invitee;
   selecting a first media type for a conference based on:
   (i) presence information of the first conference invitee,
   (ii) presence information of the at least one second conference invitee, (iii) a first rule for selection of a media type that emphasizes a first preference for a media type of the first conference invitee over a second preference for a media type of the at least one second conference invitee based on a hierarchical relationship between the first conference invitee and the at least one second conference invitee, wherein the first preference is determined by consulting a profile for the first conference invitee and wherein the second preference is determined by consulting a profile for the second conference invitee, and (ii) a second rule for the selection of the media type that emphasizes selection of media types associated with a greatest number of invitees present for the conference that satisfy a pre-defined quorum for the conference.

2. The method of claim 1 comprising:
selecting a second media type; and
receiving a message, wherein the message is from the second media type;
translating the message into the first media type to yield a translated message; and
transmitting the translated message to the first conference invitee, wherein the translated message is transmitted over a communications channel that is used by the first conference invitee to conduct the conference.

3. The method of claim 1, wherein the selecting of the first media type further comprises ensuring that the selected first media type supports specified requirements for the conference.

4. The method of claim 1, wherein the selecting of the first media type further comprises ensuring that a required artifact is available for the conference.

5. The method of claim 1 wherein the conference is initiated by neither of the first conference invitee and the at least one second conference invitee.

6. The method of claim 1, wherein the first rule evaluates priority information for the invitees.

7. An apparatus for initiating a conference with a plurality of invitees, comprising:
a memory; and
at least one processor, coupled to the memory, operative to:
execute a communication flow, wherein the communication flow identifies a first conference invitee and at least one second conference invitee;
evaluate:
(i) a presence information of the first conference invitee on a first device and
(ii) a presence information of the at least one second conference invitee on a second device;
select one of voice, email, and instant messaging as a first media type for the conference based on a first rule for selection of a media type that emphasizes a first preference for a media type of the first conference invitee over a second preference for a media type of the at least one second conference invitee based on a hierarchical relationship between the first conference invitee and the at least one second conference invitee and a second rule for the selection of the media type that emphasizes selection of media types associated with a greatest number from the plurality of invitees present for the conference that satisfy a pre-defined quorum for the conference;
select a second media type, wherein the second media type is one of voice, email and instant messaging, and wherein the second media type is different than the first media type;
receive a message, wherein the message is from the second media type;
translate the message into the first media type; and
transmit the translated message, from the communications server, to the first conference invitee, wherein the translated message is transmitted over a communications channel that is used by the first conference invitee for the conduct of the conference.

8. The apparatus of claim 7, wherein the wherein the selection of a media type based on priority information that emphasizes a preference for a media type of one of the plurality of invitees over a preference for a media type of another one of the plurality of invitees.

9. The apparatus of claim 7, wherein the processor is further configured to ensure that the selected first media type supports specified requirements for the conference.

10. The apparatus of claim 7 wherein:
the first rule evaluates a preference for a media type that is found in the profile of the first conference invitee; and
the conference is initiated by neither of the first conference invitee and the at least one second conference invitee.

11. The apparatus of claim 7, wherein the first rule evaluates priority information for the plurality of invitees.

12. A method comprising:
receiving, at a communication server, a request to establish a conference between a first conference participant and at least one second conference participant; and
selecting, at the communications server, a first media type for the conference based on a first rule for selection of a media type that emphasizes a preference for a media type of the first conference participant over a preference for a media type of the at least one second conference participant based on a hierarchical relationship between the first conference participant and the at least one second conference participant, and a second rule for the selection of the media type that emphasizes selection of media types associated with a greatest number of participants that satisfy a pre-defined quorum for the conference.

13. The method of claim 12 wherein the first rule evaluates priority information for participants.

* * * * *